United States Patent [19]

Dunyak et al.

[11] Patent Number: 5,346,661
[45] Date of Patent: Sep. 13, 1994

[54] HOT COMPRESSION PROCESS FOR MAKING EDGE SEALS FOR FUEL CELLS

[75] Inventors: Thomas J. Dunyak, Blacksburg, Va.; Samuel J. Granata, Jr., South Greensburg, Pa.

[73] Assignee: The United States of America as represented by the Department of Energy, Washington, D.C.

[21] Appl. No.: 842,765

[22] Filed: Mar. 2, 1992

Related U.S. Application Data

[63] Continuation of Ser. No. 522,756, May 14, 1990.

[51] Int. Cl.$^5$ ............................................. B29C 65/54
[52] U.S. Cl. ................................ 264/138; 264/258; 264/259; 156/291; 156/321
[58] Field of Search ................... 156/291, 283, 321; 264/259, 138, 257, 258

[56] References Cited

U.S. PATENT DOCUMENTS

| | | | |
|---|---|---|---|
| 3,257,254 | 6/1966 | Dritz | 156/291 |
| 4,611,018 | 9/1986 | Derencsenyi | 264/331.13 |

*Primary Examiner*—Jan H. Silbaugh
*Assistant Examiner*—Angela Ortiz
*Attorney, Agent, or Firm*—David E. Breeden; Stephen D. Hamel; William R. Moser

[57] ABSTRACT

A hot compression process for forming integral edge seals in anode and cathode assemblies wherein the assemblies are made to a nominal size larger than a finished size, beads of AFLAS are applied to a band adjacent the peripheral margins on both sides of the assemblies, the assemblies are placed in a hot press and compressed for about five minutes with a force sufficient to permeate the peripheral margins with the AFLAS, cooled and cut to finished size.

14 Claims, 2 Drawing Sheets

5,346,661

HOT COMPRESSION PROCESS FOR MAKING EDGE SEALS FOR FUEL CELLS

GOVERNMENT CONTRACT

This invention was conceived or first reduced to practice in the course of, or under contract number NASA-DEN3-290 between Westinghouse Electric Corporation and the United States Government, represented by the National Aeronautic and Space Agency and the Department of Energy.

This application is a continuation-in-part, of application Ser. No. 07/522,756 filed May 14, 1990.

CROSS-REFERENCE TO RELATED APPLICATIONS

This application is related to a co-pending application entitled "Integral Edge Seals For Phosphoric Acid Fuel Cells," filed Sep. 11, 1989, and assigned Ser. No. 405717.

BACKGROUND OF THE INVENTION

The invention relates to a process for forming an edge seal for a phosphoric acid fuel cell and more particularly to a process for making an integral seal for such fuel cells using a hot compression process.

A typical phosphoric acid fuel cell stack is a series of individual cells separated by electrically conductive plates. Each cell comprises an anode layer, an electrolyte matrix layer and a cathode layer. The fuel and oxidant gases are directed to the anode and cathode through an array of parallel grooves in the electrically conductive plates. The fuel cell is normally rectangular or square in shape so manifolds can be positioned on the sides to supply and collect the process gases. Air-cooled stacks may have separate manifolds for directing cooling air through ducts in the some of the electrically conductive plates. Seals are employed at the edges of the electrodes to contain the process gases and to prevent intermixing at electrode edges and manifolds.

The cells comprise three components: an anode assembly, a carbon matrix, and a cathode assembly. The cathode assembly includes a porous graphite paper electrode support layer and the electrode layer. The anode assembly is similar with a non-electrically conductive layer applied thereto. Anode and cathode reactant gases are separated by the matrix layer and the non-electrically conductive layer in the cell interior region. Edge seals are required because the porous electrode support layer would allow reactant gases to escape at the perimeter of the electrode.

U.S. Pat. No. 4,756,981 describes forming an edge seal for a phosphoric acid fuel cell by increasing the density and reducing the porosity of the edge region by impregnating the edge region with inert powder having a particle size of less than one micron so that the capillarity resulting from the surface tension of the liquid electrolyte permeating the small pores forms an edge seal which will retain the gases within the cell.

SUMMARY OF THE INVENTION

Among the objects of the invention may be noted the provision of an edge seal, which does not depend on the electrolyte to form the seal; the provision of an integral edge seal for an anode or cathode assembly, which can be trimmed to match the graphite plates; the provision of a smooth sealing surface for the gas manifolds; and the provision of an economical edge seal, which does not leak and has a seal compression characteristic that is similar to that of the cell material.

In general, a hot compression process for making edge seals for fuel cells, when used in accordance with this invention, comprises the steps of forming a rectangular-shaped electrode assembly to a nominal size larger than a finished size; applying an elastomer to a peripheral band adjacent the peripheral margins of the electrode assembly; providing a pair of press platens; heating the press platens to a temperature of about 180° C. to 230° C.; compressing the electrode assembly with the elastomer applied thereto between the heated press platens with a force sufficient to cause the elastomer to permeate the pours of the peripheral band adjacent the margins of the electrode assembly to form a seal with the elastomer with little or no buildup of the elastomer between the platen and the electrode assembly; removing the electrode assembly from between the platens; allowing the removed electrode assembly to cool to ambient temperature; and trimming the cooled electrode assembly to the finished size.

BRIEF DESCRIPTION OF THE DRAWINGS

The invention as set forth in the claims will become more apparent by reading the following detailed description in conjunction with the accompanying drawings, wherein like reference numerals refer to like parts through the drawings and in which:

DESCRIPTION OF THE PREFERRED EMBODIMENT

Figure 1:
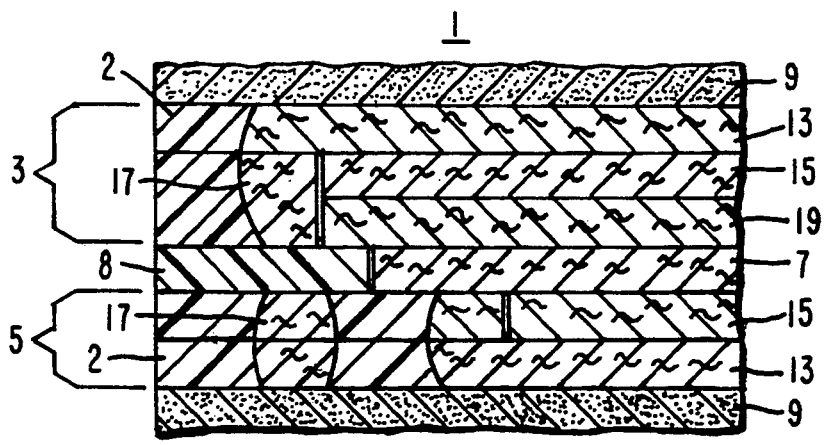
FIG. 1 is a partial sectional view of a fuel cell with integral hot pressed seals.

Referring now to the drawings in detail and in particular to FIG. 1, there is shown a phosphoric acid fuel cell 1 with an integral edge seal 2 made by a hot compression process. The fuel cell 1 comprises two electrode assemblies, an anode assembly 3, and a cathode assembly 5 with a matrix 7 and matrix seal 8 disposed therebetween. The anode assembly 3, cathode assembly 5, and matrix 7 are disposed between a pair of conductive plates 9, which supply reactant gases to the electrode assemblies 3 and 5. To prevent these gases from escaping from the electrode assemblies 3 and 5 and intermixing, the edge seals 2 are formed within a peripheral band adjacent the peripheral margins of the electrode assemblies 3 and 5. The reactant gases are supplied by manifolds (not shown), which are disposed on the sides of stacks of the cells (not shown). To ensure a good seal between the cell stacks and the manifolds, the sides of the stacks must present a smooth surface, which is generally gas-impermeable, requiring that the anode assemblies 3, cathode assemblies 5, and matrix seals 8 have approximately the same dimensions as the conductive plates 9. The integral edge seals 2 reduce the number of parts forming the electrode assemblies 3 and 5 to facilitate closer tolerances on the finished dimension of the electrode assemblies 3 & 5.

The hot compression process for making integral edge seals 2 comprises the steps of forming the electrode assemblies, the anode assemblies 3, and the cathode assemblies 5, with a sheet of backing paper 13 cut in a rectangular shape of a nominal size larger than the desired finished size. The backing paper 13 made of TORAY paper or a similar material is overlaid with a finished size catalytic layer 15, which is generally centered on the backing paper 13, and fits well within the peripheral edges of the backing paper 13. Filler strips 17 of TORAY paper or other filler material generally about the same thickness as the catalytic layer 15 are butted to the catalyst and tacked to the backing paper 13 with an elastomer tack 14, if the electrode assembly only comprises backing paper 13 and a catalytic layer 15. An insulating layer 19, such as silicon carbide, if required, may be laid over the catalatic layer 15, in which case, the filler strips 17 are about the same thickness as the combined thickness of the catalytic 15 and insulating layer 19, abut the catalyst and insulating layers 15 and 19 and are tacked in place with the elastomer tack 14. The width of the cathode assembly filler paper strip 17 is wider than the width of the anode assembly filler paper strip 17, but this does not appreciably affect the process. An elastomer, such as AFLAS 150E, 150H, 150P or 150S, which may include filler material or curing agents or compound of AFLAS material, is applied to the peripheral band, preferably on both sides of the electrode assembly 3 or 5. The AFLAS is applied as a liquid solution made up of about 22% by weight of AFLAS. The solution is applied from a syringe or automatic dispensing machine. The elastomer may also be supplied as strips of round, oval or other suitable cross section. The applied AFLAS, which may be either a solution or a strip will be referred to hereafter as a bead 21.

Figure 2:
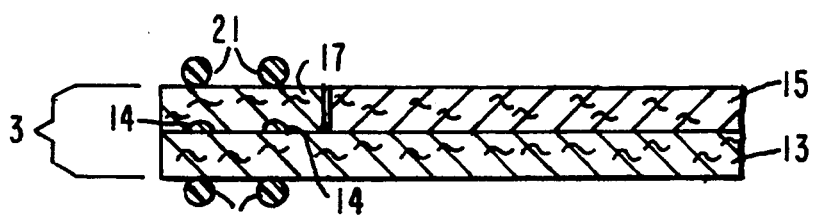
FIG. 2 is a partial sectional view of an electrode assembly.
Figure 3:
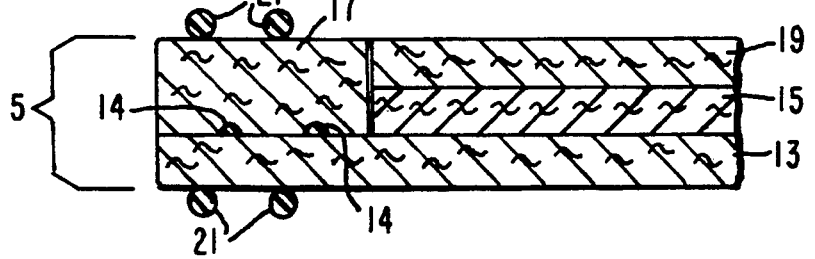
FIG. 3 is a partial sectional view of an electrode assembly with an insulating layer.

As shown in FIGS. 2 and 3, two beads 21 of the AFLAS are applied to each side of the electrode assembly 3 or 5. A first bead 21 is applied generally at the location of the desired finished outer dimension and a second bead 21 is applied inboard of first bead generally at the centerline of the filler strip and generally parallel thereto. The beads 21 on the other side of the electrode assembly 3 or 5 are applied directly opposite the beads 21 applied to the first side. If applied as a liquid solution, the beads 21 are applied to one side of the electrode assembly 3 or 5, are air dried at ambient temperature for about an hour, and then are cured in an oven at about 130° C. for about ten minutes. Then the beads 21 are applied to the other side of the electrode assembly 3 or 5, again air-dried and cured in an oven.

Figure 4:
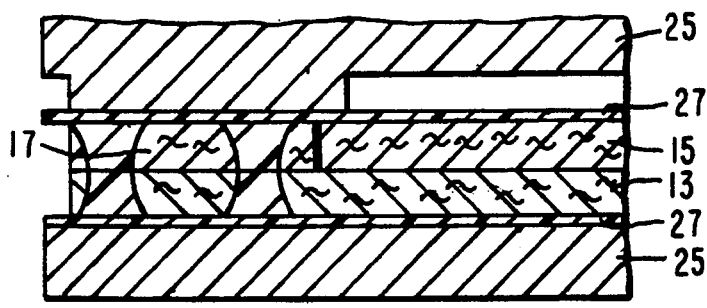
FIG. 4 is a partial sectional view of the hot compression of a electrode assembly.

FIG. 4 shows the electrode assembly 3 or 5 with the beads 21 applied disposed between press platens 25, which are covered with sheets 27 of TEFLON to prevent the AFLAS from sticking to the platens 25. The press platens 25 may be coated with a suitable material to prevent the AFLAS from sticking to the platens 25. The platens are heated to about 180° C. to 230° C., and a force is exerted on the platens 25 to compress the peripheral edges of the electrode assemblies with a pressure of about 14 kg/cm$^2$ (200 psi) on the anode assembly 3, and about 16 kg/cm$^2$ (225 psi) on the cathode assembly 5 for about five minutes each, causing the AFLAS to permeate the pores of the electrode assembly 3 or 5 adjacent the peripheral margins with little or no buildup of AFLAS between the assembly 3 or 5 and the TEFLON sheets 27 disposed on the pressure platens 25. Other combinations of pressure, temperature and time may be utilized to cause the AFLAS to permeate the pores of the electrodes. The assembly 3 or 5 is then removed from the heated press platens 25, the Teflon sheets are removed, and the assembly is allowed to cool to ambient temperature.

Figure 5:
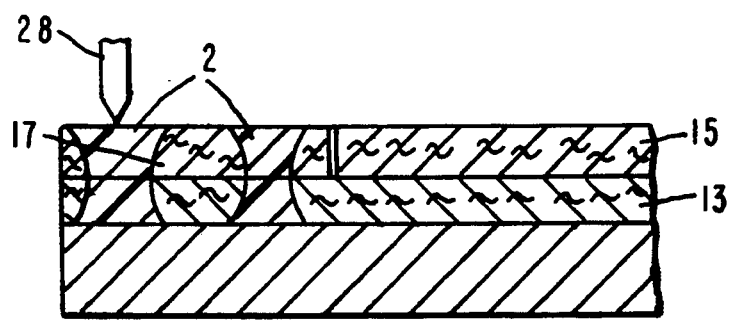
FIG. 5 is a partial sectional view of the trimming of the integral seal.

The cooled electrode assembly 3 or 5, as shown in FIG. 5, is then cut to finished size by a cutting edge 28. The cut being made generally through the central portion of the outboard bead location, whereby the peripheral edge of each assembly is permeated with AFLAS generally forming a impermeable seal at the outer boundary of the assembly to effectuate gas seals adjacent the manifolds.

Figure 6:
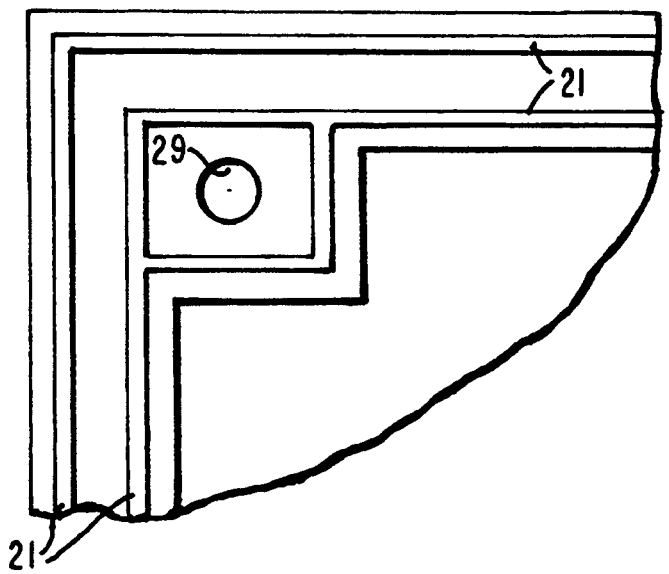
FIG. 6 is a partial view of a corner of an anode assembly.

As shown in FIG. 6, the anodes have enlarged square seal portions adjacent each corner and a hole 29 formed in the central portion thereof. The inboard beads 21 together with an L-shaped bead disposed in each corner of the anode assembly 3 form a sealed enclosure around the hole 29 to complete the integral edge seal. It is understood the L-shaped bead is applied at the same time as the other beads 21. The catalyst layer and electrical insulating layer do not extend into the corner, but the a filler strip material is used in that area.

Figure 7:
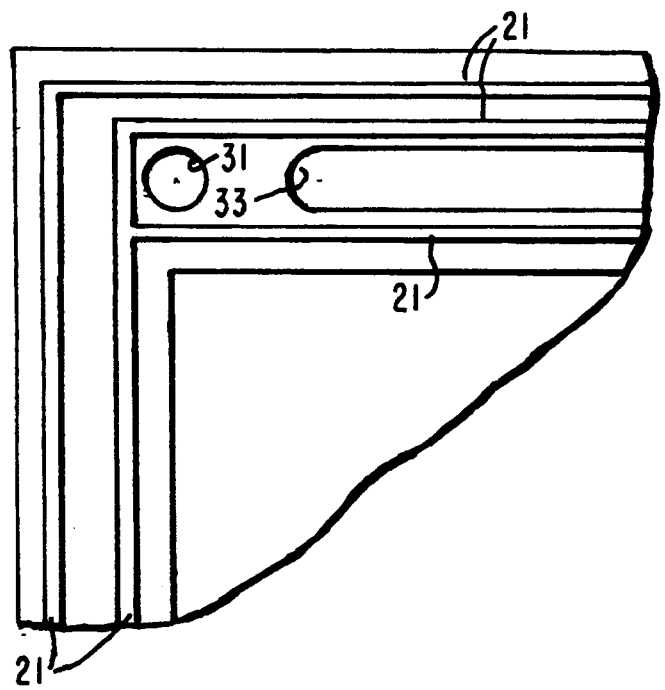
FIG. 7 is a partial view of a corner of a cathode assembly.

Opposite side portions of the cathode assembly 5, as shown in FIG. 7, have an enlarged seal portion with a hole 31 and elongated slot 33 disposed therein. The beads 21 are disposed so that there are two beads 21 outboard of the slots 33 and holes 31 and one bead 21 inboard of the holes 31 and slots 33 on opposite sides of the cathode assembly 5.

The hot compression process described herein advantageously produces a generally gas-impervious seal which is economical to produce and has compression characteristics similar to those of the electrode assemblies 3 or 5 and therefore increases the life expectancy of the electrodes.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that the claims are intended to cover such modifications and adaptations as they are considered to be within the spirit and scope of this invention.

What is claimed is:

1. A hot compression process for making edge seals for fuel cells, comprised of pairs of electrode assemblies with a matrix seal disposed between the electrodes of each pair, each pair of assemblies disposed between two gas-conducting plates comprising the steps of:

forming a rectangular-shaped electrode assembly to a nominal size larger than a finished size, the assembly having opposed sides, one side for contacting a gas-conducting plate and the opposed side for conducting a matrix seal;

applying at least one bead of elastomer to a peripheral band adjacent the peripheral margins on each opposed side of the electrode assembly so that the beads on the opposing sides are aligned;

providing a pair of press platens;

heating the press platens to a temperature generally in the range of 180° C. to 230° C.;

compressing the electrode assembly with the elastomer applied thereto between the heated press platens for a sufficient period and with a force sufficient to cause the beads to permeate the entire thickness of the adjacent assembly so that there is essentially no buildup of the elastomer between the platen and the electrode assembly and the elastomer forms a generally gas impervious seal adjacent the peripheral margins, the seal extending from one opposed side of the assembly to the other for preventing gas leakage across the peripheral margins for the assembly;

removing the electrode assembly from between the platens;

allowing the removed electrode assembly to cool to ambient temperature; and trimming the cooled electrode assembly to a finished size.

2. The process of claim 1, wherein the step of applying the elastomer to the peripheral bands of the electrode assembly comprises applying two beads of elastomer to both sides of the electrode assembly, wherein the beads on opposite sides are aligned.

3. The process of claim 2, wherein the elastomer beads are applied in the form of a liquid solution.

4. The process of claim 3, wherein the step of applying the elastomer in the form of a liquid solution comprises applying a solution, which is about 22% by weight AFLAS.

5. The process of claim 4, wherein the liquid solution is applied by an automatic dispenser.

6. The process of claim 5, wherein the elastomer is AFLAS.

7. The process of claim 4, and further comprising the step of allowing the electrode assembly with the elastomer applied in liquid form to air dry at ambient temperature for about 1 hour.

8. The process of claim 7 and further comprising the steps of placing the air-dried electrode assembly in an oven, wherein the temperature is maintained at about 130° C. and keeping the electrode assembly in the oven for about 10 minutes.

9. The process of claim 1, wherein the electrode assembly comprises a sheet of backing paper with a catalyst layer centrally disposed on the backing paper and filler strips of generally the same thickness as the catalyst layer abutting the catalyst and tacked to the backing paper with the elastomer.

10. The process of claim 9, wherein the electrode assembly is made up of a layer of silicon carbide disposed over the catalyst layer and within the filler strips generally being as thick as the combined thickness of the catalyst and insulating layers.

11. The process of claim 1, wherein the pressure is applied to the press platens for a period of about 5 minutes.

12. The process of claim 11, wherein the press platens apply the pressure only on the peripheral strips adjacent the peripheral margins of the electrode assemblies.

13. The process of claim 1, including the additional step of: providing a means between the press platens and the elastomer beads on the sides of the electrode assembly for preventing sticking of the elastomer to the platens in a temperature range of 180° C. to 230° C. before the press platens are heated to a temperature generally in the range of 180° C. to 230° C.

14. The process of claim 1, including the additional step of: providing a fluorocarbon resin between the press platens and the elastomer beads on the sides of the electrode assembly for preventing sticking of the elastomer to the platens in a temperature range of 180° C. to 230° C. before the press platens are heated to a temperature generally in the range of 180° C. to 230° C.

* * * * *